US008715096B2

(12) United States Patent
Cherbini

(10) Patent No.: US 8,715,096 B2
(45) Date of Patent: May 6, 2014

(54) GOLF SWING ANALYZER AND ANALYSIS METHODS

(76) Inventor: Michael Robert Cherbini, West Hampton, NY (US)

( * ) Notice: Subject to any disclaimer, the term of this patent is extended or adjusted under 35 U.S.C. 154(b) by 0 days.

(21) Appl. No.: 13/474,394

(22) Filed: May 17, 2012

(65) Prior Publication Data

US 2012/0295726 A1   Nov. 22, 2012

Related U.S. Application Data

(60) Provisional application No. 61/487,808, filed on May 19, 2011.

(51) Int. Cl.
*A63B 69/36* (2006.01)
*A63B 57/00* (2006.01)

(52) U.S. Cl.
USPC ........... 473/219; 473/131; 473/151; 473/221; 473/223; 473/224; 473/226; 473/231

(58) Field of Classification Search
USPC .......... 473/131, 151, 223, 224, 221, 226, 231
See application file for complete search history.

(56) References Cited

U.S. PATENT DOCUMENTS

| | | | |
|---|---|---|---|
| 4,088,324 A | 5/1978 | Farmer | |
| 4,940,236 A | 7/1990 | Allen | |
| 5,779,555 A * | 7/1998 | Nomura et al. | 473/223 |
| 6,072,467 A | 6/2000 | Walker | |
| 6,413,167 B1 | 7/2002 | Burke | |
| 6,441,745 B1 | 8/2002 | Gates | |
| 6,607,450 B1 | 8/2003 | Hackman | |
| 6,767,282 B2 * | 7/2004 | Matsuyama et al. | 463/3 |
| 7,766,757 B2 * | 8/2010 | Brooks et al. | 473/215 |
| 7,850,536 B1 | 12/2010 | Fitzgerald | |

(Continued)

FOREIGN PATENT DOCUMENTS

| | | |
|---|---|---|
| CN | 1775336 A | 5/2006 |
| CN | 1887386 A | 1/2007 |

(Continued)

OTHER PUBLICATIONS

International Search Report (ISR) and Written Opinion dated Nov. 23, 2012 (in English) issued in counterpart International Application No. PCT/US2012/038413.

(Continued)

*Primary Examiner* — William Brewster
*Assistant Examiner* — Ryan Hsu
(74) *Attorney, Agent, or Firm* — Holtz, Holtz, Goodman & Chick, PC

(57) ABSTRACT

A golf club including a swing analyzer includes an accelerometer that measures acceleration in three directions, a magnetometer/gyroscope unit, a processor unit that converts the measured acceleration and golf club movement during a non-ball-striking or ball-striking swing into an estimated carrying distance of a golf ball when struck by the golf club based on swing position and a type of the golf club, and a display that displays the estimated carrying distance as a function of swing position to the golfer. The accelerometer, magnetometer/gyroscope unit, and processor unit may be mounted in a handle at a grip end of the golf club. The estimated carrying distance calculation may be performed at a unit separate from the golf club and capable of performing this calculation for several golf clubs with which it communicates via cooperating communications unit.

28 Claims, 6 Drawing Sheets

(56) References Cited

U.S. PATENT DOCUMENTS

| | | |
|---|---|---|
| 7,870,790 B2 | 1/2011 | Sato et al. |
| 8,109,816 B1 | 2/2012 | Grober |
| 8,425,292 B2 | 4/2013 | Lui et al. |
| 2002/0077189 A1 | 6/2002 | Tuer et al. |
| 2003/0207718 A1 | 11/2003 | Perlmutter |
| 2004/0033843 A1 | 2/2004 | Miller, IV et al. |
| 2005/0054457 A1 | 3/2005 | Eyestone et al. |
| 2005/0215340 A1 | 9/2005 | Stites et al. |
| 2005/0227775 A1 | 10/2005 | Cassady et al. |
| 2005/0261073 A1 | 11/2005 | Farrington, Jr. et al. |
| 2006/0111197 A1 | 5/2006 | Yamamoto et al. |
| 2006/0166738 A1 | 7/2006 | Eyestone et al. |
| 2006/0184336 A1 | 8/2006 | Kolen |
| 2007/0105639 A1 | 5/2007 | Hasegawa |
| 2007/0167251 A1 | 7/2007 | Pathross et al. |
| 2007/0219744 A1 | 9/2007 | Kolen |
| 2009/0131190 A1 | 5/2009 | Kimber |
| 2009/0233735 A1 | 9/2009 | Savarese et al. |
| 2009/0239673 A1 | 9/2009 | Drimer |
| 2009/0321289 A1 | 12/2009 | LaSala |
| 2010/0063352 A1 | 3/2010 | Matsuura |
| 2010/0125816 A1 | 5/2010 | Bezos |
| 2010/0216563 A1 | 8/2010 | Stites et al. |
| 2010/0216564 A1 | 8/2010 | Stites et al. |
| 2010/0216565 A1 | 8/2010 | Stites et al. |
| 2012/0052972 A1* | 3/2012 | Bentley .................. 473/223 |

FOREIGN PATENT DOCUMENTS

| | | |
|---|---|---|
| CN | 1996205 A | 7/2007 |
| CN | 201519460 U | 7/2010 |
| WO | WO 2012/159551 A1 | 11/2012 |

OTHER PUBLICATIONS

3BaysGSA PRO—Golf Swing Analyzer User Manual (in English), 19 pages (URL:http://www.3bayslife.com/gsa/support_download.php?product=5).

* cited by examiner

GOLF SWING ANALYZER AND ANALYSIS METHODS

This application claims priority under 35 U.S.C. §119(e) of U.S. Provisional Application Ser. No. 61/487,808, filed May 19, 2011, which is incorporated by reference herein.

FIELD OF THE INVENTION

The present invention relates to a device that analyzes swings of a golf club by a golfer in order to provide the golfer with an estimate of a distance a golf ball will carry after being struck by that club with that type of swing. The present invention also relates to methods for analyzing a golfer's swings of their golf clubs in order to create a database containing information about estimated carrying distances of a golf ball when struck by each club with that type of swing. This database enables the golfer to improve the selection of one of their golf clubs to use when seeking to hit the golf ball a desired distance.

BACKGROUND OF THE INVENTION

One of the most difficult decisions a golfer must make when playing golf is the selection of one of their golf clubs to use for each stroke during a golf game. This decision is repeatedly made for each stroke in view of the relatively large number of golf clubs that are used to play golf. The impact of each different golf club against the golf ball will result in a different carrying distance of the golf ball and therefore it is extremely important for a golfer to select the most suitable golf club to use for each shot.

Moreover, each golf club is often used in one of several possible clock or swing positions. The carrying distance of the golf ball when struck by the same golf club will vary as a function of the swing position. It is therefore important for the golfer to select not only the most suitable golf club to use for each shot, but also the swing position in which to use the selected golf club.

OBJECTS AND SUMMARY OF THE INVENTION

An object of one or more embodiments of the present invention is to provide an analyzer integrated into a golf club that analyzes golf swings of the golf club in order to provide the golfer with an estimate of the distance a golf ball will carry after being struck by the club with that type of swing.

Another object of one or more embodiments of the present invention is to provide methods for analyzing golf swings by a golfer in order to create a database containing information about estimated carrying distances of a golf ball struck by each of the golfer's clubs with that type of swing, which database can enable the golfer to improve the selection of one of their golf clubs to use when seeking to hit the golf ball a desired distance.

Accordingly, a golf club including a swing analyzer in accordance with the invention includes an accelerometer that measures acceleration in three directions, a processor unit that converts the measured acceleration during a non-ball-striking or ball-striking swing into an estimated carrying distance of a golf ball when struck by the golf club based on swing position and a type of the golf club, and a display that displays the estimated carrying distance as a function of swing position to the golfer. The accelerometer, processor unit and display may be mounted in a handle at a grip end of the golf club.

A related method for displaying estimated carrying distance of a golf ball as a function of swing position for a golf club includes, in a training stage, for each swing or clock position of the golf club for which estimated carrying distance of a golf ball is sought, measuring, using an accelerometer on the golf club, acceleration of the golf club during a non-ball-striking or ball-striking swing in three directions, and converting, using a processor unit on the golf club, the measured acceleration into an estimated carrying distance of a golf ball when struck by the golf club based on the swing position and a type of the golf club. Once the training stage is complete, the method entails storing the estimated carrying distance for each swing position in a data storage unit on the golf club and displaying on a display visible from an exterior of the golf club, the estimated carrying distance as a function of swing position. In one embodiment, the acceleration measuring and converting steps are repeated for each swing position to obtain a plurality of estimated carrying distances for the same swing position; and the plurality of estimated carrying distances for each swing position are averaged. The average estimated carrying distance for each swing position is stored in the data storage unit, and then can be displayed as a function of swing position.

Another golf swing analysis arrangement that includes a part integrated into the golf club and a separate part includes, in each golf club, an accelerometer that measures acceleration in three directions and a first communications unit that transmits the measured acceleration. A handheld unit separate and apart from the golf clubs comprises a second communications unit arranged to communicate with the first communications unit and receive the measured acceleration, a processor unit that converts the received measured acceleration from each golf club into an estimated carrying distance of a golf ball when struck by that golf club based on swing position and a type of that golf club, and a display that can display the estimated carrying distance as a function of swing position for all of the golf clubs from which acceleration measurements have been received.

A related method for enabling a golfer to obtain estimated carrying distance of a golf ball as a function of swing position for at least one golf club comprises, in a training stage, for each swing position: measuring, using an accelerometer on the golf club, acceleration of the golf club during a non-ball-striking or ball-striking swing in three directions; and transmitting, using a first communications unit on the golf club, the measured acceleration to a second communications unit on a handheld unit. The method also includes converting, using a processor unit at the handheld unit, the measured acceleration provided by the first communications unit of each golf club into an estimated carrying distance of a golf ball when struck by that golf club based on the swing position and a type of that golf club. As such, the estimated carrying distance of a golf ball when struck by each golf club is available as a function of swing position.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
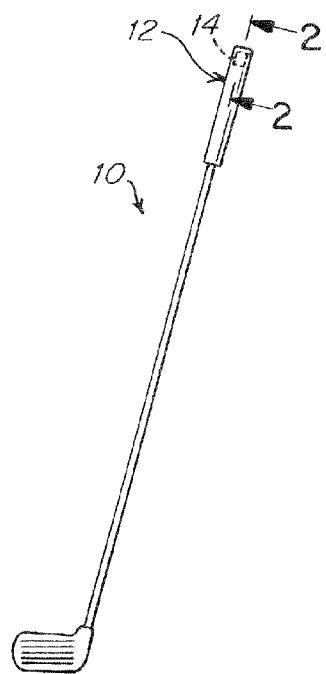
FIG. 1 is a perspective view of a golf club including a swing analyzer tool in accordance with the invention.
Figure 2:
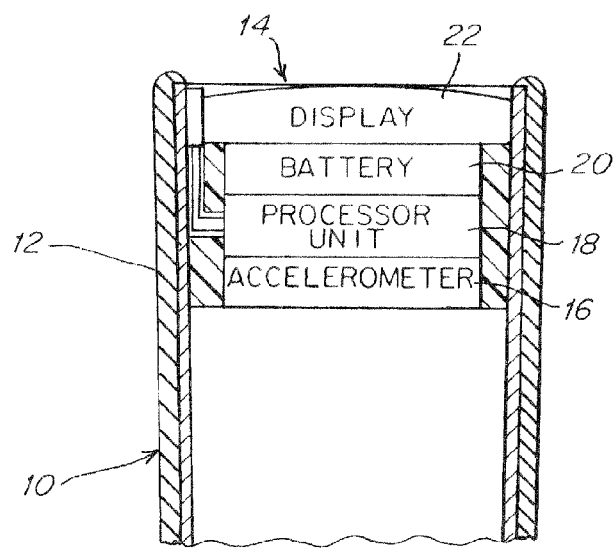
FIG. 2 is a cross-sectional view of a grip end of a first embodiment of a golf club including a swing analyzer tool in accordance with the invention, that part encircled and designated 2 in FIG. 1.

Referring to the accompanying drawings wherein like reference numerals refer to the same or similar elements, FIG. 1 shows a golf club 10 including a swing analyzer tool 14 in accordance with the invention. More specifically, as shown in FIG. 2, a grip end 12 of a handle of the golf club 10 houses the swing analyzer tool 14 that includes an accelerometer 16, a processor 18 coupled to the accelerometer 16 and a battery 20 electrically coupled to and that provides power to the accelerometer 16 and processor unit 18. The swing analyzer tool 14 also includes a display 22 coupled to the processor unit 18 and powered by the battery 20.

Swing analyzer tool 14 may be assembled as an integral unit and inserted into a hollow portion of the handle at the grip end 12 thereof, e.g., in the interior of a tubular portion of the handle. Ideally, the swing analyzer tool 14 should be designed and constructed to avoid significantly affecting the weight or swing dynamics of the golf club 10.

The accelerometer 16 is preferably a three-axis accelerometer that measures acceleration of the golf club in three orthogonal directions. Acceleration measured by accelerometer 16 is used by the processor unit 18 to calculate motion of the grip end 12 of the golf club 10 and/or speed of the head of the golf club. An exemplifying, non-limiting accelerometer is one designated BMA220. Multiple accelerometers may be used.

Figure 5:
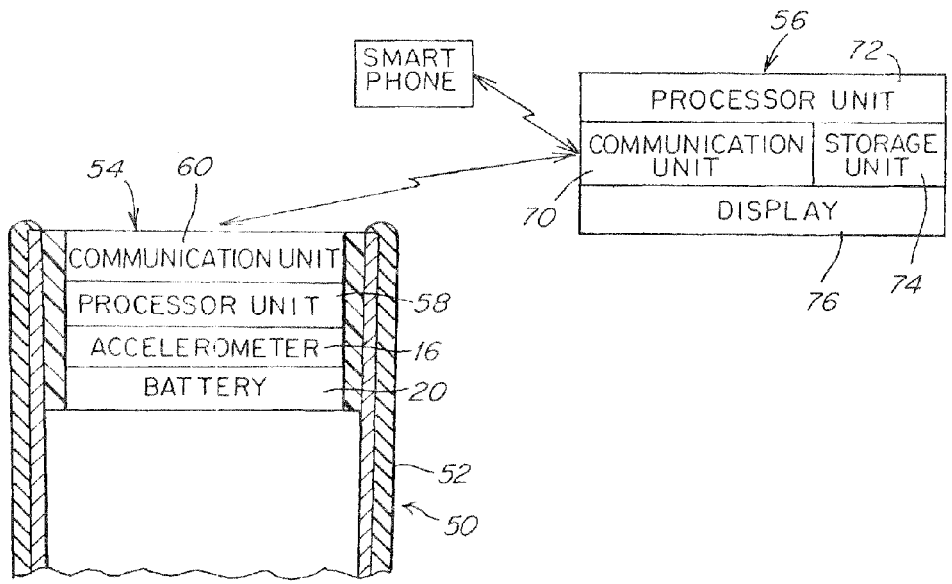
FIG. 5 is a cross-sectional view of a grip end of a second embodiment of a golf club in accordance with the invention in combination with a handheld unit.
Figure 5A:
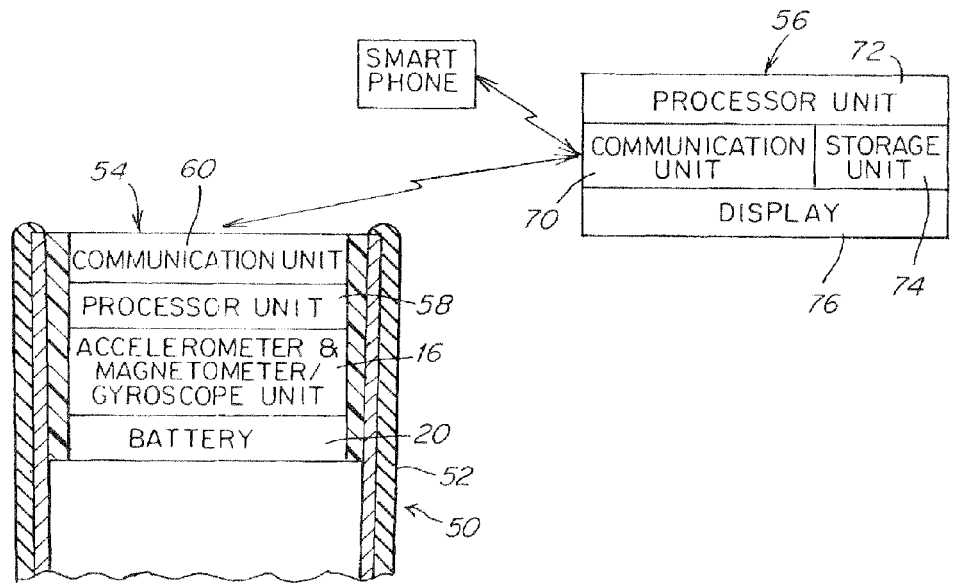
FIG. 5A shows a modified second embodiment.

As shown in FIG. 5A, the accelerometer may be a dual unit which includes an accelerometer and a magnetometer (or a gyroscope), which are commercially available, for example, from STMicroelectronics, Geneva, Switzerland, and sold by Digi-Key Corporation, Thief River Falls, Minn. USA. This allows measuring the angle of the golf club face at impact with the ball and allows determination of the swing plane of the golf club. At impact, the acceleration slows and at that point, the angle of the club face is determined in relation to the swing plane and stored.

Processor unit 18 may be an OTP chip set that includes hardware and software components capable of processing acceleration measured by the accelerometer(s) 16 and converting the measured acceleration into data about the motion of the grip end 12 of the golf club 10 during a swing and/or data about the club head speed during the swing. Processor unit 18 is also provided with information about the type of golf club 10, e.g., from a database that is provided with this information, and calculates an estimated carrying distance for the golf ball. The carrying distance is dependent on both the actual swing, i.e., dependent on the accelerations measured by the accelerometer(s) 16, and the type of golf club, e.g., a 3 iron, 5 iron, 7 iron, etc. This calculation may not be precise in view of, for example, atmospheric conditions that affect the flight of the golf ball such as wind, and thus the processor unit 18 provides a prediction or estimation of the carrying distance.

Instead of or in addition to the battery 20, another power source may be provided. The order and position of the accelerometer 16, processor unit 18 and battery 20 shown in FIG. 2 is not limiting and these components may be arranged in a different order and/or relative positioning.

Display 22 has an exposed display surface that allows viewing of the contents thereof, e.g., by the golfer or his or her caddy. Display 22 is controlled by the processor unit 18 to display an estimate of the carrying distance of the golf ball as a function of the swing position. In one embodiment, the display 22 is controlled to show a 3 line by 3 character readout of various swing positions, e.g., 7:30, 9:00, 10:30 and full swing, that may be set during an earlier training stage, along with the estimated carrying distance of a golf ball for each swing position.

Figure 3:
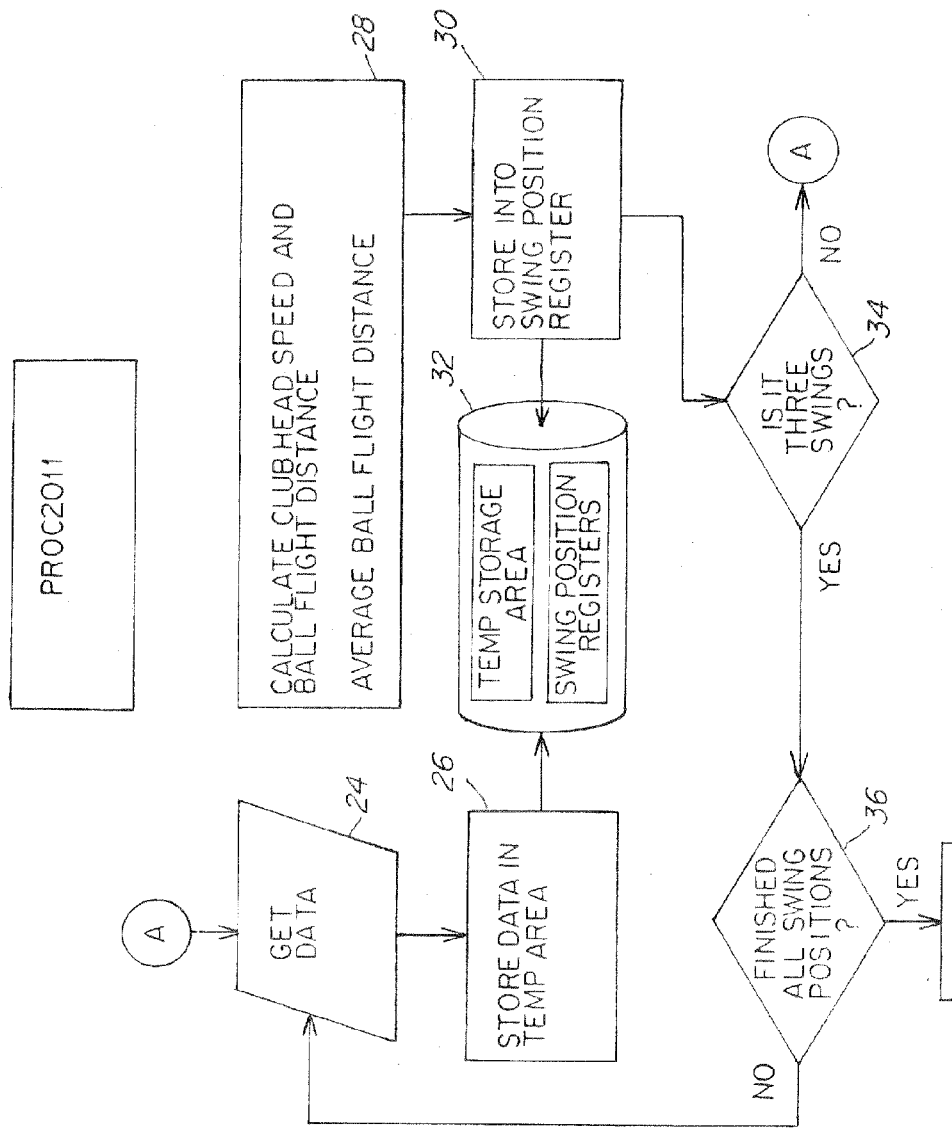
FIG. 3 is a flow chart showing one manner in which the swing analyzer tool of the golf club shown in FIG. 1 is trained in a training stage.
Figure 4:
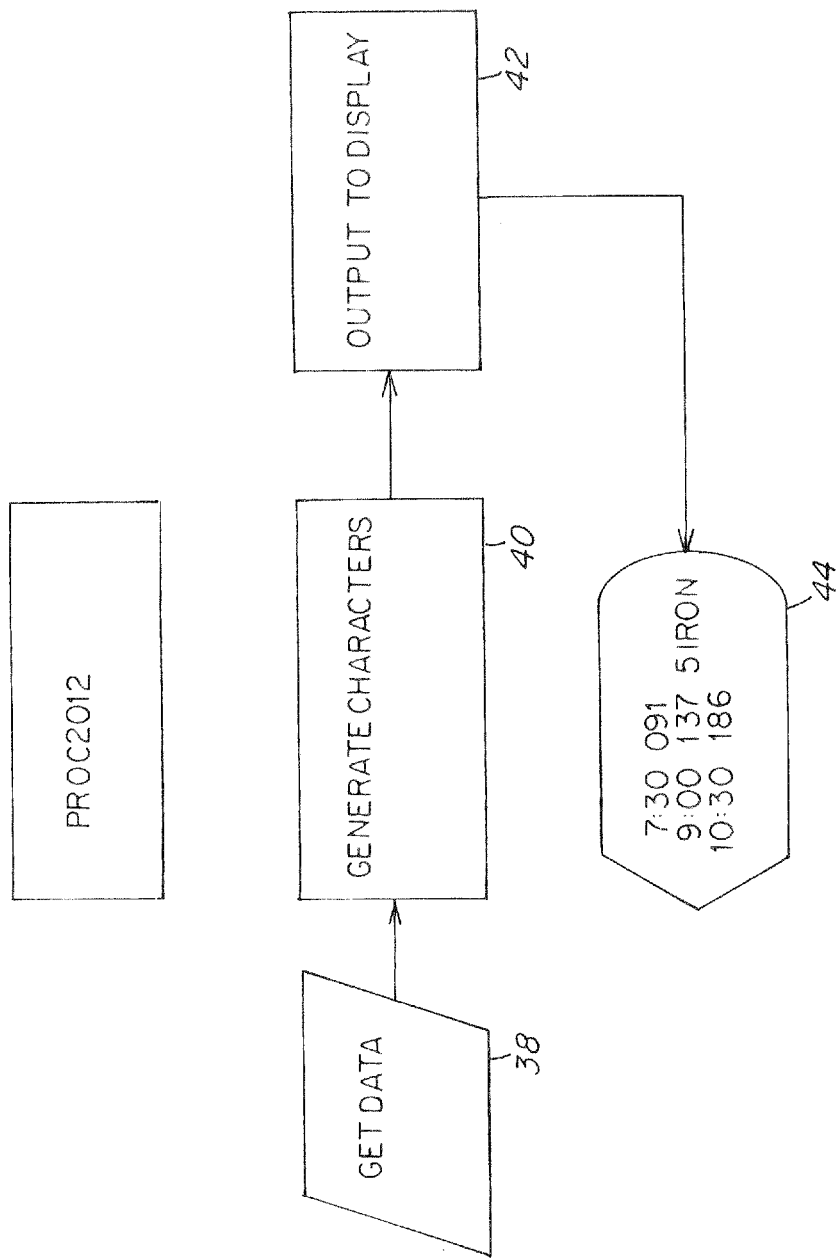
FIG. 4 is a flow chart showing one manner in which the swing analyzer tool of the golf club shown in FIG. 1 displays data for a golfer to use when determining which of a plurality of different golf clubs in their set to use to strike a ball a desired distance.

Referring now to FIGS. 3 and 4, which in combination depict the manner in which the swing analyzer tool 14 can be trained to operatively display the estimated carrying distance of a golf ball as a function of the swing position for a golf club, in a training stage of the golf club 10, the golfer swings the golf club 10 at a first one of a plurality of different swing positions, e.g., 7:30, 9:00, 10:30 or full swing, and the accelerometer 16 measures acceleration (Get Data 24) during the swing. At this time, the golf club 10 is not striking a golf ball. The measured acceleration is stored in a temporary data storage unit in the processor unit 18 (Store Data in Temp Area 26). Processor unit 18 calculates the speed of the head of the golf club 10 from the measured acceleration and the estimated carrying distance (Average Ball Flight Distance 28). This information is associated with the type of golf club, which may be input into the processor unit 18 when the swing analyzer tool 14 is installed onto the golf club 10, and stored in a swing position register in the processor unit 18 (Store into Swing Position Register 30). The temporary storage area and swing position register may be part of the processor unit 18 (element 32), or accessible by the processor unit 18.

A computer program may be resident in the processor unit 18 and designed to interact with the accelerometer 16, storage area and swing position register to perform the functions described above.

It is beneficial to require the golfer to swing the golf club a plurality of times at each swing position to account for variations in each swing. To this end, a counter is effected at 34 to determine whether the golfer has swung the golf club at each swing position a specific number of times, e.g., three times. If not, the data gathering steps are repeated to thereby provide multiple estimations of the carrying distance of a golf ball when struck by the specific golf club for that golfer. This repetition is desirable because it is difficult to repeat a swing from the same swing position with exactly the same force and so multiple estimations of the carrying distance are obtained and can be averaged. The swing position at which the golf club 10 is swung can be determined by analysis of the measured acceleration provided by the accelerometer 16, e.g., the time at which the acceleration changes.

Another counter is effected at 36 when the golfer has swung the golf club at one swing position the specific number of times, e.g., three, to determine whether the golfer has finished swinging the golf club at all of the desired swing positions. If not, the golfer continues to swing the golf club at the different swing position until he or she has swung the golf club three times at each of the different swing positions. Once this occurs, the training stage is considered complete.

Data obtained during the training stage may be entered into a virtual table of swing positions and estimated carrying distances for a plurality of different swing positions and a plurality of different swings. A sample format for such a table is as follows, and includes the averaged carrying distance for each of four different swing positions.

TABLE 1

| Swing position | Swing | Estimated carrying distance (yards) | Averaged carrying distance (yards) |
| --- | --- | --- | --- |
| 7:30 | 1 | 90 | 91 |
| | 2 | 91 | |
| | 3 | 92 | |
| 9:00 | 1 | 135 | 137 |
| | 2 | 137 | |
| | 3 | 139 | |
| 10:30 | 1 | 183 | 186 |
| | 2 | 186 | |
| | 3 | 189 | |
| Full swing | 1 | 190 | 193 |
| | 2 | 193 | |
| | 3 | 196 | |

Such a table is created in the processor unit 18 for that golf club 10 in which the processor unit 10 is arranged. Thus, if every golf club 10 in a golfer's set has swing analyzer tool 14, a separate table will be created in the processor unit 18 of each swing analyzer tool 14. The table may be stored in a data storage unit that is part of or accessible to the processor unit 18.

When the system includes a magnetometer/gyroscope as described above, additional data such as swing plane, club face angle (at impact and during the swing), acceleration and club height are obtained, which will alter distance calculations. For example, the loft of the club face in relation to swing plane affects distance calculations.

As shown in FIG. 4, the data from the table (Get Data 38) is processed by the processor unit 18 to generate display command signals indicative of the carrying distance of a golf ball if the golf ball were to be struck by the golf club for the different swing positions (Generate Characters 40). The processor unit 18 directs the commands for the display (Output to Display 42) and the display 22 may appear as shown at 44, i.e., the swing position of the swing followed on the same line by the averaged estimated carrying distance. Optionally, the type of club (5 iron) is included on the display.

With the foregoing training stage of the swing analyzer tool 14, each golf club in the golfer's set will display the estimated carrying distance of a golf ball when struck by that club from one or more different swing positions. If the golfer is looking to hit the ball a set distance, e.g., 137 yards, the golfer or his or her caddy would look at their golf clubs 10, view the displays 22 on each and see which provides that carrying distance and from which swing position. For example, the golfer would select the 5 iron and swing from the 9:00 position if they seek to hit a golf ball approximately 137 yards.

The data being displayed may be the data calculated by the processor unit 18 in the most recent training stage and stored in the data storage unit. In a preferred embodiment, the training stage is conducted earlier in the same day that the golfer will be golfing. The training stage may be performed at a driving range or other place that the golfer warms up to prepare to play a round of golf.

A reset feature is provided in the swing analyzer tool 14, e.g., a reset button 46 as shown in FIG. 2, to enable the golfer to reset the processor unit 18 to clear the data storage unit and initiate the training stage anew. If the golfer does not initiate the training stage prior to use, then the processor unit 18 will generate and direct display commands to the display 22 to display the data obtained from the most recent training stage and that has been stored in the data storage unit (in accordance with the steps depicted in FIG. 4). Thus, reset of the processor unit 18 is an optional, but preferred, feature.

Another embodiment of a golf swing analyzer in accordance with the invention removes the acceleration measurement processing function from each golf club and performs it at a common location thereby centralizing the calculation of the carrying distance for a plurality of golf clubs at a single location. The electronics package in each golf club may therefore be reduced in size and/or complexity in comparison to the electronics in the embodiment described above.

Specifically, with reference to FIG. 5, the golf swing analyzer in this embodiment of the invention includes a swing analyzer measurement portion 54 in the grip end 52 of the handle of a golf club 50, and a remote or handheld unit 56. The swing analyzer measurement portion 54 includes an accelerometer 16 of combination accelerometer and gyroscope or magnetometer unit (as described above), a processor unit 58 coupled to the accelerometer 16, and a battery 20 (as described above) that is electrically coupled to and provides power to the accelerometer 16 and processor unit 58. A communications unit 60 is also housed in the grip end 52 of the golf club 50, receives power from the battery 20, and is coupled to the processor unit 58.

Swing analyzer measurement portion 54, with or without the communications unit 60, may be assembled as an integral unit and inserted into a hollow portion of the handle of the golf club 50 at the grip end 52 thereof. Ideally, the swing analyzer measurement portion 54 and communications unit 60 should be designed and constructed to avoid affecting the weight or swing dynamics of the golf club 50.

Figure 6:
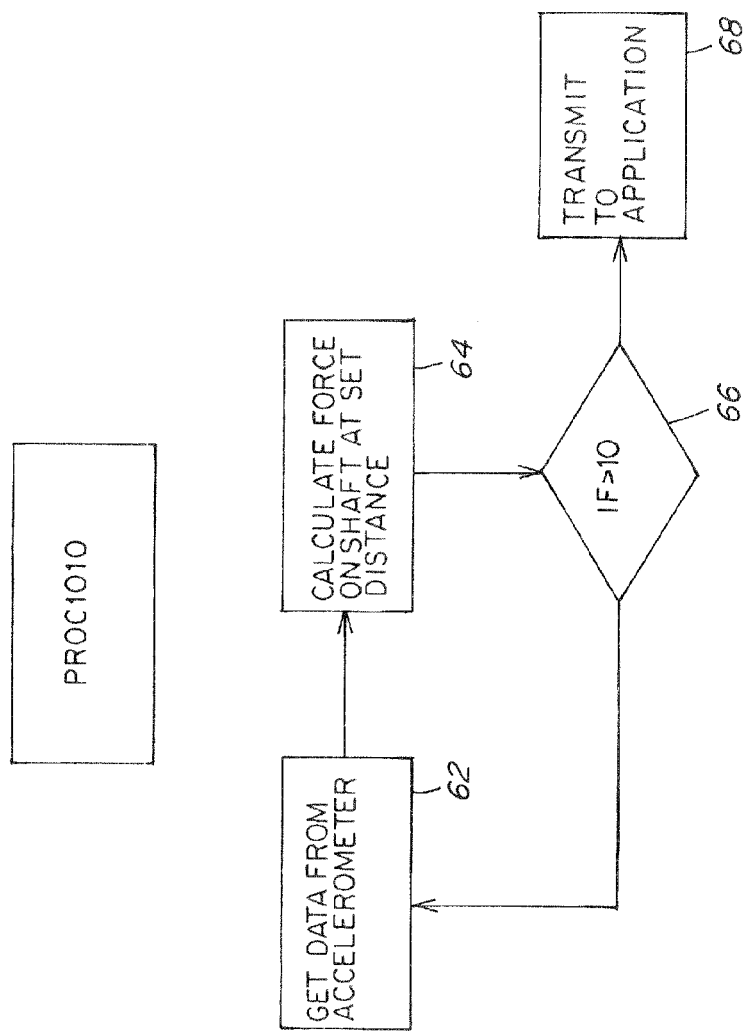
FIG. 6 is a flow chart showing one manner in which information from the golf club is provided to the handheld unit.

Processor unit 58 may be an OTP chip set that includes hardware and software components capable of processing acceleration measured by the accelerometer(s) 16 (see Get Data from Accelerometer 62 in FIG. 6) and converting the measured acceleration into data about the force on the shaft and position of the face of the club at impact at a set distance (See Calculate Force on Shaft at Set Distance 64 in FIG. 6). If the measured force exceeds a threshold (e.g., 10 as shown at 66 in FIG. 6), the measured force or a signal derived therefrom is transmitted via the communications unit 60 to the handheld unit 56 (see Transmit to Application 68 in FIG. 6). If not, acceleration and face position at impact of the golf club 50 is obtained again. The threshold is set so that only acceleration or force measurements arising from actual swings of the golf club 50 are transmitted to the handheld unit 56.

A computer program may be resident in the processor unit 58 and designed to interact with the accelerometer 16, communications unit 60 to perform the functions described above.

Handheld or remote unit 56 includes an application or computer program embodied on a non-transitory computer-readable medium that performs the golf ball carrying distance estimation or prediction steps, as well as manages the training stage described above. Importantly, the handheld unit 56 receives acceleration measurement data from the golf clubs equipped with a swing analyzer measurement portion 54 and the club face angle in relation to the swing plane, and manages the carrying distance estimation steps for all golf clubs equipped with the swing analyzer measurement portion 54 that are designed to communicate therewith.

Handheld or remote unit 56 may be a standalone unit for use only with the golf clubs equipped with the swing analyzer measurement portion 54, and incorporating the application thereon, or may be a smartphone or similar device with the application embodied thereon or downloaded thereto and that can be used for other purposes.

Handheld or remote unit 56 includes a communications unit 70 that communicates with the communications unit 60 on each golf club 50, i.e., with the communications units present on all of the golf clubs 50 equipped with swing analyzer measurement portions 54 and which have been designated to communicate therewith. Communications unit 70 may be an integral part of the handheld unit 56 as is the case when the handheld unit 56 is a smartphone.

Communications unit 70 may also communicate with another device such as a Smartphone, to perform more data manipulations relating to the golf swing and/or swing results to provide more information to the user. The data and the calculation/manipulation results can be stored in the Smartphone and displayed when desired. Currently usable Smartphones are Apple iOS iPhones and Android operating system phones. A usable application for these types of Smartphones is GOLFLOGIX™, by GolfLogix, Inc., Scottsdale, Ariz. USA, the contents of which are incorporated herein by reference.

Different communications protocols may be used by the communications units 60, 70, but a preferred communications protocol is Bluetooth.

Handheld or remote unit 56 also includes a processor unit 72, a storage unit 74 and a display 76. When the handheld unit 56 is a smartphone or similar device, all of the processor unit 72, storage unit 74 and display 76 may be integral components thereof. Processor unit 72 performs functions similar to those performed by the processor unit 18 described above, e.g., calculates an estimated carrying distance for the golf ball based on the acceleration measured by the accelerometer(s) 16 and transmitted via the communications units 60, 70, and the type of club provided to the application or computer program in the processor unit 72. Storage unit 74 receives and stores information about the carrying distance of each club as a function of clock or swing position, e.g., in the form of a virtual table associating the type of club, the swing or swing position and the estimated carrying distance. An example of such a virtual table is as follows:

TABLE 2

| Club type | Swing or swing position | Estimated carrying distance (yards) |
|---|---|---|
| 3 iron | 7:30 | 84 |
|  | 9:00 | 125 |
|  | 10:30 | 175 |
|  | Full swing | 195 |
| 5 iron | 7:30 | 91 |
|  | 9:00 | 137 |
|  | 10:30 | 186 |
|  | Full swing | 200 |
| 7 iron | 7:30 | 99 |
|  | 9:00 | 146 |
|  | 10:30 | 195 |
|  | Full swing | 205 |

Figure 7:
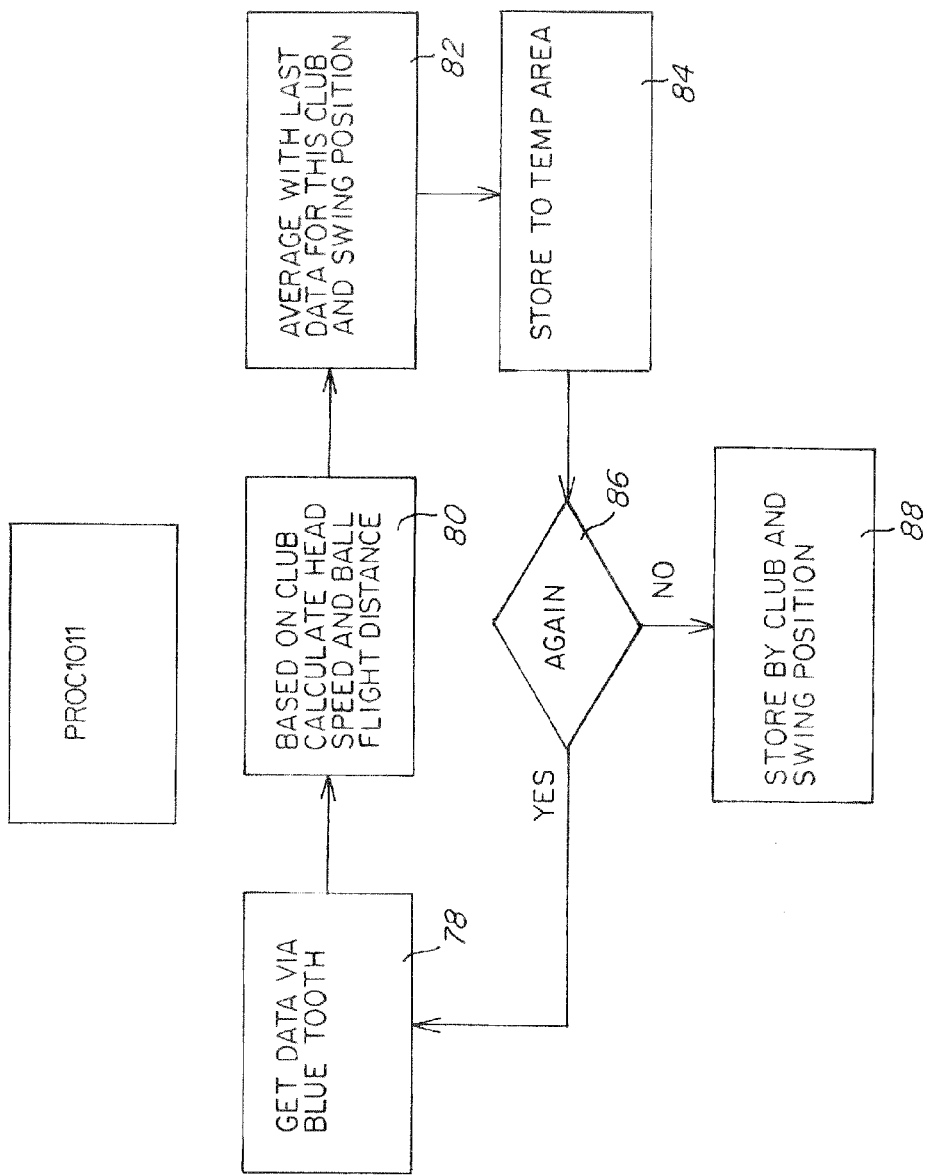
FIG. 7 is a flow chart showing one manner in which information from a plurality of golf clubs, such as the one shown in FIG. 1, is processed by the handheld unit.

FIG. 7 is a flow chart showing one manner in which information from the processor unit 58 of each golf club 50 is processed by the processor unit 72 in the handheld unit 56. The acceleration measured during each swing is measured by the accelerometer 16 and obtained by the processor unit 72 of the handheld unit 56 (Get Data via Blue Tooth 78). From the data provided by each golf club 50 during each swing thereof, the processor unit 72 calculates the speed of the head of the golf club 50 from the measured acceleration and the estimated carrying distance from the calculated speed and type of club (Calculate Head Speed and Ball Flight Distance 80). It would be possible to calculate the carrying distance directly from the measured acceleration and type of club.

Processor unit 72 then averages the calculated carrying distance for the same club swung at the same swing position (Average with Last Data for this Club and Swing position 82). The averaged carrying distance is stored in a temporary data storage unit in or coupled to the processor unit 72 (Store to Temp Area 84), which may be part of storage unit 74. Handheld unit 56 then monitors for another transmission of measured acceleration, i.e., reception of measured acceleration signals from a communications unit 60 of a golf club 50 (Again, 86). If one is received, it repeats steps 78-84. If not, processor unit 72 stores the averaged carrying distance for the golf clubs 50 in the golfer's set in association with each club (arranged by type) and one or more swing positions thereof (Store by Club and Swing Position 88).

During the training stage, the golfer can determine the number of swings of each golf club at each swing position and when satisfied with the number of swings, the golfer can indicate via a user interface of the handheld unit 56 that he or she is done with the golf club for that swing position. The handheld unit 56 will then save the data for that golf club for that swing position in a permanent data storage unit and then consider the last average to be the final estimated carrying distance for that golf club at that swing position.

Once the training stage is complete, the handheld unit 56 can be manipulated to display the estimated carrying distance of a golf ball when struck by all the clubs in the golfer's set from one or more different swing positions. If the golfer is looking to hit the ball a set distance, e.g., 137 yards, the golfer or his or her caddy would access the handheld unit 56 and view the display 76 and see which provides that distance and from which swing position. Alternatively, the handheld unit 56 may be programmed to receive an entry by the golfer or his or her caddy of the distance the golf ball is sought to be hit and be provided with a list of one or more types of golf clubs and swing positions in which those golf clubs can be swung to reach the desired distance.

The data being provided to the golfer may be the last data calculated by the processor unit 72 in the most recent training stage and stored in the storage unit 74. In a preferred embodiment, the training stage is conducted earlier in the same day that the golfer will be golfing. The training stage may be performed at a driving range or other place that the golfer warms up to prepare to play a round of golf.

Additional functions may be included in the application or computer program in the handheld unit 54. For example, the application or computer program may be designed to enable the golfer to keep score of their round of golf, i.e., enter the number of strokes of each hole in the round of golf, and also provide the type of golf club used for each stroke. This data can later be accessed by the golfer to see how they performed, e.g., enable a comparison of the estimated carrying distance to the actual carrying distance.

A reset feature is provided in the handheld unit 56 to enable the golfer to reset the processor unit 72 to clear the data in the storage unit 74 and initiate the training stage anew. If the golfer does not initiate the training stage prior to use, then the processor unit 72 will generate and direct display commands to the display 76 to display the data obtained from the most recent training stage and that has been stored in the storage unit 74 (in accordance with the steps depicted in FIG. 7). Thus, reset of the processor unit 72 is an optional, but preferred, feature.

The swing analyzer described above provides a golfer with an excellent estimation of the carrying distance of a golf ball for a golf club swing at a specific swing position because it has been trained on actual swings by the golfer of the same club and conversion of information about these swings into estimated carrying distances. The golfer can improve their golf game since they can better select a club to use to hit a golf club for different situations during a round of golf.

In the context of this specification, a computer-readable medium, or more specifically, a non-transitory computer-readable medium, could be any means that can contain, store, communicate, propagate or transmit a program for use by or in connection with the method, system, apparatus or device. The computer-readable medium can be, but is not limited to (not an exhaustive list), an electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

It is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention.

The invention claimed is:

1. A golf club, comprising:
an accelerometer that measures acceleration;
a processor unit coupled to said accelerometer and that converts acceleration measured by said accelerometer during a plurality of swings for a plurality of swing positions into an average estimated carrying distance of a golf ball when struck by the golf club based a number of swings taken at the same one of plurality of swing positions and a type of the golf club, said processor unit determining the average estimated carrying distance by converting acceleration measured by said accelerometer during each swing into a respective estimated carrying distance of the golf ball and then averaging the estimated carrying distances of the golf ball; and
a display coupled to said processor unit and that is controlled by said processor unit to selectively display the average estimated carrying distance as a function of one of the plurality of swing positions, said display having an exposed display surface visible from an exterior of the golf club.

2. The golf club of claim 1, further comprising a handle having a grip end, said accelerometer and said processor unit being part of a swing analyzer tool mounted in said handle at said grip end.

3. The golf club of claim 2, wherein said swing analyzer tool further comprises a power source that provides power to said accelerometer and said processor unit when necessary.

4. The golf club of claim 2, wherein said swing analyzer tool further comprises a magnetometer unit coupled to said processor unit for determining at least a club face position at impact with a golf ball and a club position before impact and subsequent to impact.

5. The golf club of claim 1, wherein said processor unit is input with the type and characteristics of a golf club.

6. A method for displaying estimated carrying distance of a golf ball as a function of one of a plurality of swing positions for a golf club, comprising:
in a training stage, for each of at least one of the plurality of swing positions,
measuring, using an accelerometer on the golf club, acceleration of the golf club;
converting, using a processor unit, the measured acceleration into an estimated carrying distance of a golf ball when struck by the golf club based on a number of swings taken at the same one of the plurality of swing positions and a type of the golf club;
repeating the acceleration measuring and converting steps for each one of the plurality of swing positions to obtain a plurality of estimated carrying distances for the same one of the plurality of swing positions; and
averaging the plurality of estimated carrying distances for each one of the plurality of swing positions; and
storing an average estimated carrying distance for each one of the plurality of swing positions in a data storage unit; and
selectively displaying on a display the average estimated carrying distance as a function of the one of the plurality of swing positions.

7. The method of claim 6, wherein the training stage involves the plurality of different swing positions.

8. The method of claim 6, further comprising inputting the type and characteristics of a golf club to the processor unit.

9. The method of claim 6, wherein the step of measuring acceleration of the golf club comprises measuring acceleration in three directions.

10. A golf swing analysis arrangement, comprising: at least one golf club, each of said at least one golf club comprising:
an accelerometer that measures acceleration; and
a first communications unit that transmits the measured acceleration; and
a unit separate and apart from the at least one golf club and that comprises:
a second communications unit arranged to communicate with the first communications unit of each golf club and receive the measured acceleration;
a processor unit that converts the received measured accelerations for a plurality of swings for a number of swings taken at the same one of a plurality of swing positions into an average estimated carrying distance of a golf ball when struck by the golf club based on the one of the plurality of swing positions and a type of the golf club, said processor unit determining the average estimated carrying distance by converting acceleration measured by said accelerometer during each swing into a respective estimated carrying distance of the golf ball and then averaging the estimated carrying distances of the golf ball; and a display coupled to said processor unit and that is controlled by said processor unit to enable display of the average estimated carrying distance as a function of one of the plurality of swing positions.

11. The arrangement of claim 10, wherein said at least one golf club comprises a plurality of golf clubs.

12. The arrangement of claim 10, wherein said separate unit further comprises a storage unit that stores information about the carrying distance of each club as a function of the one of the plurality of swing positions.

13. The arrangement of claim 10, wherein said accelerometer and said first communications unit are part of a swing analyzer measurement portion arranged in a grip end of a handle of each golf club.

14. The arrangement of claim 10, further comprising a magnetometer unit coupled to said processor unit for determining at least a club face position at impact with a golf ball and a club position before impact and subsequent to impact.

15. The arrangement of claim 13, wherein said swing analyzer measurement portion further comprises an additional processor unit arranged to control transmission of measured acceleration from said golf club.

16. The arrangement of claim 13, wherein said swing analyzer measurement portion further comprises a power source that provides power to said accelerometer and said first communications unit, when necessary.

17. A method for enabling a golfer to obtain estimated carrying distance of a golf ball as a function of for at least one golf club, comprising:
in a training stage, for each of at least one a plurality of swing positions,
measuring, using an accelerometer/magnetometer/gyroscope unit on the golf club, acceleration, club face data and swing data of the golf club;
transmitting, using a first communications unit on the golf club, the measured acceleration, club face data and swing data to a second communications unit on a separate unit;
repeating the acceleration measuring and transmitting steps for each swing position to obtain a plurality of estimated carrying distances for the same one of the plurality of swing positions; and
converting, using a processor unit at the separate unit, the measured acceleration, club face data and swing data provided by the first communications unit of each golf club into an estimated carrying distance of a golf ball when struck by that golf club based on the one of the plurality of swing positions and a type and characteristics of that golf club;
averaging, at the processor unit of the separate unit, the plurality of estimated carrying distances for each one of the plurality of swing positions for each golf club; and
selectively displaying the average estimated carrying distance for each golf club as a function of a number of swings taken at one of the plurality of swing positions, whereby the average estimated carrying distance of a golf ball when struck by each golf club is available as a function of the swings taken at the same one of the plurality of swing positions.

18. The method of claim 17, further comprising inputting the type of each golf club to the processor unit.

19. The method of claim 17, wherein the step of measuring acceleration, club face data and swing data of the golf club of the golf club comprises measuring acceleration in three directions.

20. The method of claim 17, further comprising storing the average estimated carrying distance for each of the plurality of swing positions for each golf club in a data storage unit on the separate unit.

21. The method of claim 17, wherein the step of measuring acceleration, club face data and swing data of the golf club of the golf club comprises measuring acceleration of the golf club during a non-ball-striking swing.

22. The golf club of claim 1, wherein said accelerometer measures acceleration in three directions.

23. The method of claim 6, wherein the step of converting the measured acceleration into an estimated carrying distance of the golf ball comprises converting the measured acceleration into an estimated carrying distance of the golf ball using a processor on the golf club.

24. The method of claim 6, wherein the step of measuring acceleration of the golf club comprises measuring acceleration of the golf club during a non-ball-striking swing.

25. The method of claim 6, wherein the step of storing the average estimated carrying distance for each position of the plurality of swing positions in a data storage unit comprises storing the average estimated carrying distance for each of the plurality of swing positions in a data storage unit on the golf club.

26. The method of claim 6, wherein the step of displaying on a display the average estimated carrying distance as a function of at least one of the plurality of swing positions comprises displaying on a display on the golf club, the average estimated carrying distance as a function of the at least one of the plurality of swing positions.

27. The method of claim 6, wherein the step of measuring acceleration of the golf club comprises measuring acceleration in three directions during a non-ball-striking swing, the step of converting the measured acceleration into an estimated carrying distance of the golf ball comprises converting the measured acceleration into an estimated carrying distance of the golf ball using a processor on the golf club, the step of storing the average estimated carrying distance for each of the at least one of the plurality of swing positions in a data storage unit on the golf club, and the step of displaying on a display the average estimated carrying distance as a function of at least one of the plurality of swing positions.

28. The arrangement of claim 10, wherein said an accelerometer measures acceleration in three directions.

* * * * *